United States Patent Office 3,524,851
Patented Aug. 18, 1970

3,524,851
1-PHENOXY-3-MORPHOLINO ALKYLAMINO-2-PROPANOLS
Burton Kendall Wasson, Valois, Quebec, and Nathan Norman Share, Montreal, Quebec, Canada, assignors to Merck & Co., Inc., Rahway, N.J., a corporation of New Jersey
No Drawing. Filed Oct. 21, 1966, Ser. No. 588,312
Int. Cl. C07d 87/40
U.S. Cl. 260—247.5        7 Claims

ABSTRACT OF THE DISCLOSURE

The tile compounds possess $\beta$-blocking properties. The products are prepared by reacting a 1-(substituted phenoxy)-3-haloalkanol or a 2,3-epoxy-1-(substituted phenoxy)-propane with a primary or secondary amine or with a primary or secondary aminoalkylamine.

---

This invention relates to novel pharmacologically active compounds which have been found to be potent $\beta$-adrenergic blocking agents. In particular, this invention relates to novel substituted phenoxy propan-2-ol amines and those wherein the amino nitrogen is substituted with a tertiary aminohydrocarbon group, their preparation, and non-toxic acid addition salts thereof.

The compounds of the instant invention are represented by the structural formula:

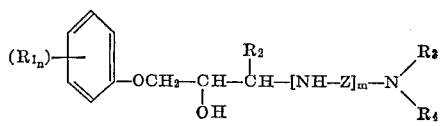

wherein:

$R_1$ is hydroxy, or loweralkoxy of from 1 to 3 carbon atoms and can be located at any position on the benzenoid nucleous;
$n$ is 1 or 2;
$R_2$ represents hydrogen or loweralkyl of from 1 to 3 carbon atoms,
$NR_3R_4$ is morpholino;
$Z$ represents a straight chain hydrocarbon group of up to 4 carbon atoms; and
$m$ is the integer one (1).

Recently a great deal of attention has been focused upon preparing pharmacologically active compounds possessing $\beta$-adrenergic activity. This activity, in general, is of great value in the treatment of angina, and the management of cardiac arrythmias and in reducing some forms of outflow tract obstructions in congenital and acquired heart lesions.

Although a great deal of research effort has been directed toward discovering a really useful $\beta$-adrenergic blocker, to date those agents prepared have been deficient either with regard to activity or because they possess toxicity or other undesirable side effects, thus reducing their therapeutic ratio and overall usefulness. There is, therefore, a continuing need for a potent $\beta$-adrenergic blocking agent. It is a primary object of this invention to provide such an agent and a process for its preparation.

An advantage of this invention is that it provides an agent with an uncommonly high degree of activity. A further advantage is that an agent is provided with a degree of toxicity and other undesirable side effects lower than that possessed by other $\beta$-adrenergic blocking agents.

We have found that the substituted phenoxy propanolamines of the above formula have an unusually high degree of activity in inhibiting the cardioacceleration induced by isopropylnorepinephrine. Further, they have a negligible amount of chronatropic activity, and no significant effect on normal mean blood pressure, but exhibit a dose-related inhibition of the vasodepressor response to isopropylnorepinephrine.

The process of preparing the compounds of this invention is illustrated by the following reaction scheme:

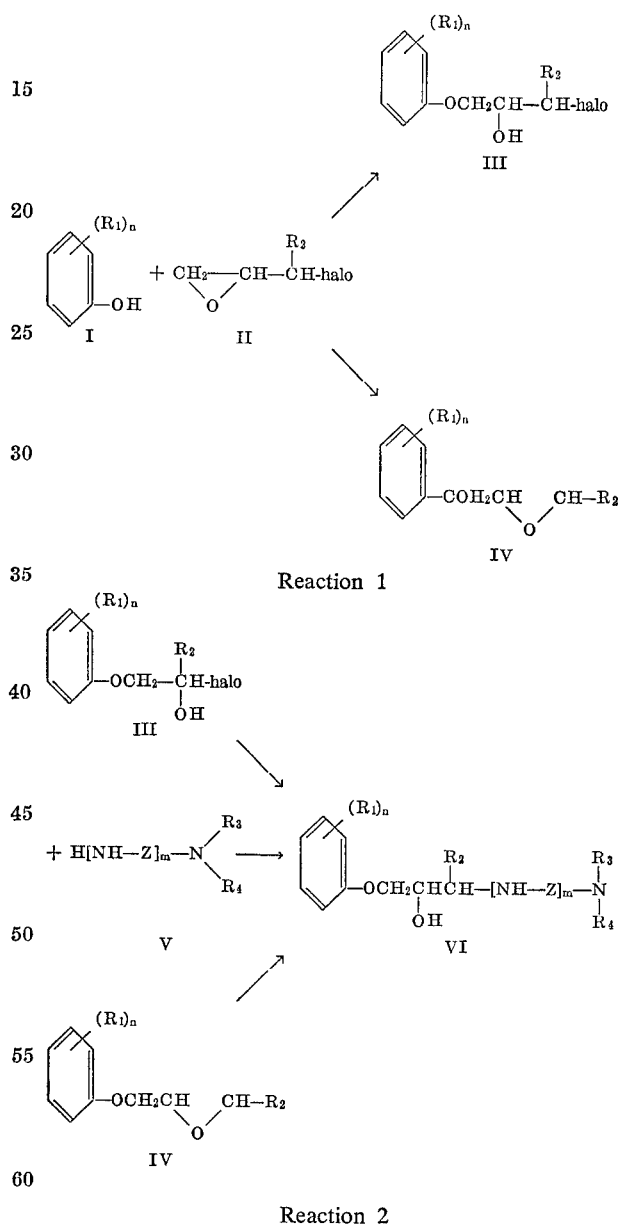

As can be seen from the reaction scheme, the end product (VI) can be produced through two different compounds namely compounds III and IV. In order to produce compound III, reaction 1 is usually conducted using a large excess of haloepoxide (II) as a solvent at steam bath temperature for about 20 hours in the presence of a basic catalyst such as piperidine or morpholine followed by evaporation of the excess epoxide. Although the usual halo group of the epoxide is chloro, the bromo- or iodo compound can be used in its place.

An excess of the halo compound is normally employed, but the reaction proceeds equally well with an equimolar amount or a slight excess, particularly if an inert solvent such as benzene, toluene or the like is employed, in which case the reflux temperature of the solvent can be conveniently used, as any temperature from about 50° C. to about 150° C. is satisfactory at which to conduct the reaction. Other bases can be used as catalyst equally well such as most organic bases of comparable basic strength, or inorganic bases such as sodium carbonate and potassium carbonate. The time required for the reaction depends on the temperature and is normally 15 to 24 hours. In some instances the requisite period may be less than 15 hours and much longer periods can be employed but are not usually necessary.

The 2,3-epoxy-1-(substituted phenoxy)-propane (IV) can be produced using essentially the same reactants enumerated for the preparation of compound III, except that in order to form the epoxide (IV) a strong inorganic base, particularly sodium hydroxide or potassium hydroxide is utilized rather than a basic catalyst such as piperidine or morpholine. Normally an excess of the strong inorganic base is used but the reaction will proceed equally well if equimolar quantities or a slight excess of the strong inorganic base is present. Similarly, the haloepoxide (II) can be used as a solvent, although it is convenient to add the haloepoxide to an aqueous solution of the substituted phenol and the strong inorganic base. The reaction is then usually completed by stirring the reactants at room temperature for about 18 hours. The time and temperature of the reaction however, are not critical and can vary anywhere from about 10 to 25 hours and from about 15° C. to about 30° C. depending on the particular reactants and conditions employed.

Reaction 2 is normally performed using an excess of the amino compound as solvent, by heating the reactants at about 100° C.–150° C. for about 5 hours, and extraction of the free base from an aqueous basic mixture, followed, if desired, by conversion to an acid addition salt such as the hydrochloride or hydrobromide acid addition salt by treatment with the appropriate aqueous acid. If however, the epoxy compound (IV) is used as a reactant in this reaction, a molar amount or preferably smaller amounts of an alkali metal iodide, preferably potassium iodide or sodium iodide must be added ot the reaction mixture. The reaction can be conducted equally well with equivalent amounts of reactants, particularly in the presence of an inert solvent such as toluene or xylene or a high boiling alcohol, such as butanol or cyclohexanol, in which case the reflux temperature of the solvent is most conveniently used, as temperatures in the range of 100 to 200° C. are satisfactory with an appropriately adjusted time. The time and temperature vary with the particular reactants employed, but at 150° C. the time required is normally 3 to 6 hours. Longer periods may be employed but are not usually necessary.

The compounds wherein $R_1$ is hydroxyl are prepared by demethylation of the corresponding methoxy compounds with 48% hydrobromic acid, by standard procedures.

Our invention can be illustrated by the following examples. They should be regarded as illustrations of the invention and not as limitations thereof.

EXAMPLE 1

1-(2-methoxyphenoxy)-3-(2-N-morpholinoethylamino)-2-propanol (A) Preparation of 1-(2-methoxyphenoxy)-3-chloro-2-propanol.—A mixture of 24.8 g. (0.2 mole) of guaiacol, 55.5 g. (0.6 mole) of epichlorohydrin, and 0.5 ml. of piperidine is warmed on a steam bath for 20 hours. The excess epichlorohydrin is removed by distillation on a water pump to give 50.9 g. of a residue. The residual oil is cooled, shaken for 1 hour with 60 ml. of concentrated hydrochloric acid, washed with water to remove excess acid, and then distilled to give 32.4 g. of 1-(2-methoxyphenoxy)-3-chloro-2-propanol, B.P. (15 mm.) 186–197° C., $n_D^{25}$ 1.5445.

(B) Preparation of 1-(2-methoxyphenoxy) - 3 - (2 - N-morpholinoethylamino)-2-propanol.—A mixture of 16.3 g. of 1-(2-methoxyphenoxy)-3-chloro-2-propanol and 30 g. of 2-aminoethylmorpholine is warmed during 1.5 hours to 155° C. and maintained at this temperature for two hours longer. The mixture is made basic and evaporated to dryness in vacuo. The residue is acidified, evaporated to dryness and the solid recrystallized from methanol-acetone to give 18.8 g. of 1-(2-methoxyphenoxy)-3-(2-N-morpholinoethylamino) - 2 - propanol dihydrochloride, melting at 185–192° C. Further recrystallization from the same solvent mixture affords an analytical sample, M.P. 191–193° C.

Analysis.—Calculated for $C_{16}H_{28}Cl_2N_2O_4$ (percent): C, 50.13; H, 7.36; N, 7.31. Found (percent): C, 50.68; H, 7.59; N, 7.25.

Following the procedure of Example 1 but using an equivalent amount of 3-ethoxy phenol, 2-propoxy phenol or phenol in place of guaiacol, there is produced 1-(3-ethoxyphenoxy) - 3 - (2-N-morpholinoethylamino)-2-propanol, 1 - (2 - propoxyphenoxy)-3-(2-N-morpholinoethylamine) - 2-propanol, and 1-phenoxy-3-(2-N-morpholinoethylamino)-2-propanol respectively.

EXAMPLE 2

1-(2-methoxyphenoxy)-3-(2-N-morpholinoethylamino)-2-propanol (A) Preparation of 2,3-epoxy-1-(2-methoxyphenoxy)-propane.—210 grams (2.25 mole) of epichlorohydrin is added dropwise to a solution of 186.3 grams (1.5 mole) of guaiacol and 72 grams (1.8 mole) of sodium hydroxide pellets in 1500 ml. of water over a period of about 2½ hours. During this addition, the temperature of the reaction solution is maintained at 20° C. using a water and ice bath. The reaction is then stirred at room temperature for about 18 hours. The resulting mixture is extracted three times with chloroform. The chloroform extracts are combined, treated with 10 drops of glacial acetic acid, washed with water, stripped to remove light boiling liquids and distilled under water-pump pressure to yield 212.2 grams of 2,3-epoxy-1-(2-methoxyphenoxy)-propane as a colorless liquid, B.P. (14 mm.) 157–180° C., $n_D^{25}$ 1.5383.

(B) Preparation of 1 - (2-methoxyphenoxy)-3-(2-N-morpholinoethylamino)-2-propanol.—A mixture of 13.5 g. of 2,3-epoxy-1-(2-methoxyphenoxy)-propane, 30 g. of 2-aminoethylmorpholine and 8.3 g. of powdered potassium iodide is warmed during 1.5 hours to 155° C. and maintained at this temperature for two hours longer. The mixture is made basic and evaporated to dryness in vacuo. The residue is acidified, evaporated to dryness and the solid recrystallized from methanol-acetone to give 18.8 g. of 1 - (2 - methoxyphenoxy) - 3 - (2-N-morpholinoethylamino)-2-propanol dihydrochloride, melting at 185–192° C. Further recrystallization from the same solvent mixture affords an analytical sample, M.P. 191–193° C.

Analysis.—Calculated for $C_{16}H_{28}Cl_2N_2O_4$ (percent): C, 50.13; H, 7.36; N, 7.31. Found (percent): C, 50.68; H, 7.59; N, 7.25.

EXAMPLE 3

1-(3-methoxyphenoxy)-3-(2-N-morpholinoethylamino)-2-propanol

In the same manner as set forth in Example 1, a mixture of 62.1 g. m-methoxyphenol, 135.8 g. of epichlorohydrin, and 1 g. piperidine gives 87.3 g. 1-(3-methoxyphenoxy)-3-chloro-2-propanol, B.P. (4 mm.) 166–179° C., $n_D^{25}$ 1.5444. A mixture of 10.8 g. of 1-(3-methoxyphenoxy)-3-chloro-2-propanol and 19.5 g. of N-(β-aminoethyl)-morpholine is heated five hours at 140–153° C. The brown semi-solid is dissolved in $H_2O$, acidified with 6 N hydrochloric acid, and extracted with chloroform.

The aqueous acidic fraction is made basic with sodium hydroxide, extracted with chloroform, and the chloroform solution evaporated to dryness to give 21.6 g. of liquid. Distillation of this liquid affords 5.1 g. of a colorless liquid and a residue. Treatment of the residue with dilute hydrochloric acid gives 9 g. of crude 1-(3-methoxyphenoxy)-3-(2-N-morpholinoethylamino)-2 - propanol dihydrochloride melting at 163–168° C. Recrystallization of this material from ethanol affords an analytical sample melting at 171–173° C.

*Analysis.*—Calculated for $C_{16}H_{28}Cl_2N_2O_4$ (percent): C, 50.13; H, 7.36; N, 7.31. Found (percent): C, 49.97; H, 7.04; N, 7.12.

EXAMPLE 4

1-(4-methoxyphenoxy)-3-(2-N-morpholinoethylamino)-2-propanol

In the same manner as set forth in Example 1, p-methoxyphenol and epichlorohydrin are condensed in the presence of piperidine by warming 16.5 hours on the steam bath to give a 78.5% yield of 1-(4-methoxyphenoxy)-3-chloro-2-propanol, B.P. (0.2 mm.) 130–145° C. A mixture of 1-(4-methoxyphenoxy)-3-chloro-2-propanol and N-(β-aminoethyl)-morpholine is heated 6 hours at about 130° C. and the product worked up as described in Example 3 to give 1-(4-methoxyphenoxy)-3-(2-N-morpholinoethylamino)-2 - propanol dihydrochloride melting at 198–201° C. Purification of this product from methanol and diethyl ether affords an analytical sample melting at 199–203° C.

*Analysis.*—Calculated for $C_{16}H_{28}Cl_2N_2O_4$ (percent): C, 50.13; H, 7.36; N, 7.31. Found (percent): C, 50.11; H, 6.88; N, 7.24.

EXAMPLE 5

1-(2,6-dimethoxyphenoxy)-3-(N-morpholinoethylamino)-2-propanol

In the same manner as set forth in Example 1, 2,6-dimethoxyphenol and epichlorohydrin, gives a 69.5% yield of 1-(2,6-dimethoxyphenoxy)-3-chloro-2-propanol, B.P. (0.5–2.0 mm.) 130–145° C., $n_D^{25}$ 1.5340. A mixture of 12.3 g. of 1-(2,6-dimethoxyphenoxy)-3-chloro-2-propanol and 19.5 g. of N-(β-aminoethyl)-morpholine is heated 4.75 hours at 132–154° C. and left overnight at room temperature. The product is separated by the procedure described in Example 3, except that a small amount of phenol is removed by extraction of a solution of the product in CHCl₃ with strong alkali. A yield of 7.6 g. of 1 - (2,6 - dimethoxyphenoxy) - 3 - (N-morpholinoethylamino)-2-propanol dihydrochloride melting at 234–237° C. is obtained. Recrystallization from methanol-ethyl ether gives an analytical sample melting at 235–237° C.

*Analysis.*—Calculated for $C_{17}H_{30}Cl_2N_2O_5$ (percent): C, 49.40; H, 7.22; N, 6.78. Found (percent): C, 49.16; H, 7.12; N, 6.72.

EXAMPLE 6

1-(2-methoxyphenoxy)-3-(3-N-morpholinopropylamino)-2-propanol

In the same manner as set forth in Example 1, a mixture of 16.3 g. of 1-(2-methoxyphenoxy)-3-chloro-2-propanol and 34.4 g. of N-(3-aminopropyl)morpholine is heated 4.5 hours at 142–158° C. in an oil bath and left at room temperature over the weekend. The product is obtained by the method described in Example 3. The crude yield of 1-(2-methoxyphenoxy)-3-(3-N-morpholinopropylamino)-2-propanol dihydrochloride consists of 23.4 g. melting at 159–164° C. Recrystallization of the product from methanol-ethyl ether gives an analytical sample melting at 172–174° C.

*Analysis.*—Calculated for $C_{16}H_{30}Cl_2N_2O_4$ (percent): C, 51.36; H, 7.62; N, 7.05. Found (percent): C, 51.50; H, 7.38; N, 7.12.

EXAMPLE 7

1-(2-methylphenoxy)-3-(2-N-morpholinoethylamino)-2-propanol

In the same manner as set forth in Example 1, a mixture of 10.8 g. of o-cresol, 27.8 g. epichlorohydrin, and piperidine gives an 87.5% yield of 1-(2-methylphenoxy)-3-chloro-2-propanol, B.P. (14 mm.) 156–165° C., $n_D^{25}$ 1.5335. A mixture of 10.0 g. of 1-(2-methylphenoxy-3-chloro-2-propanol and 19.5 g. of N-(2-aminoethyl)morpholine is heated 5.5 hours at about 135° C. and left overnight at room temperature. The product is worked up by the method described in Example 3 to give a 50.5% yield of 1-(2-methylphenoxy)-3-(2-N-morpholinoethylamino)-2-propanol dihydrochloride melting at 201–206° C. An analytical sample is obtained by recrystallization from methanol melting at 202–212° C.

*Analysis.*—Calc'd. for $C_{16}H_{28}Cl_2N_2O_3$: C, 52.32; H, 7.68; N, 7.63. Found (percent): C, 52.15; H, 7.27; N, 7.38.

EXAMPLE 8

1-(2-methoxyphenoxy)-3-(2-N-morpholinoethylamino)-2-butanol

Following the same procedure as set forth in Example 1 except employing an equimolar amount of 3-chloro-1-2-epoxybutane, in place of epichlorohydrin, there is produced 1-(2-methoxyphenoxy)-3-(2-N-morpholinoethylamino)-2-butanol.

Following the procedure of Example 8 above but using 3-chloro-1,2-epoxypentane or 3-chloro-1,2-epoxyhexane in place of 3-chloro-1,2-epoxybutane, there is produced 1-(2-methoxyphenoxy) - 3 - (2-N - morpholinoethylamino)-2-pentanol and 1-(2-methoxyphenoxy)-3(2-N-morpholinoethylamino)-2-hexanol respectively.

EXAMPLE 9

1-(2-hydroxyphenoxy-3-(2-morpholinoethylamino)-2-propanol 1 (2 - methoxyphenoxy)-3-(2-morpholinoethylamino)-2-propanol dihydrochloride (4.5 g.) is dissolved by warming 50 ml. MeOH, stirring 1 hour with 0.94 g. of sodium hydroxide, the solids removed, and the filtrate evaporated to dryness to give 3.8 g. of residue. This residue is dissolved in 8.5 g. of 48% hydrobromic acid solution and refluxed for 3 hours. The mixture is refrigerated and the solids collected to give 3.7 g. of crude 1-(2-hydroxyphenoxy)-3-(2-morpholinoethylamino) - 2-propanol dihydrobromide, M.P. 236–238° C. Recrystallization of a sample from ethanol-water affords an analytical sample, melting at 236–240° C.

*Analysis.*—Calc'd. for $C_{15}H_{26}Br_2N_2O_4$ (percent): C, 39.32; H, 5.72; N, 6.11.

Found (percent): C, 39.42; H, 5.77; N, 5.88.

Infrared spectral analysis shows the presence of the phenolic hydroxy group.

EXAMPLE 10

1-(2-methoxyphenoxy)-3-morpholino-2-propanol

A mixture of 16.3 g. of 1-(2-methoxyphenoxy)-3-chloro-2-propanol and 19.6 g. of morpholine was heated 1 hour in an oil bath with an internal temperature of 103° C. The mixture was cooled and the solid removed. The liquors were acidified with 6 N hydrochloric acid and extracted with diethyl ether. The aqueous layer was made basic with dilute sodium hydroxide solution, extracted with ether, and the ether evaporated. The residue of 11.8 g. was distilled to afford 8.2 g. of 1-(2-methoxyphenoxy) - 3 - morpholino-2-propanol, B.P. (0.015–0.03 mm.) 132° C.–136° C., $n_D^{25}$ 1.5395. The distilled oil crystallized from ethyl ether-petroleum ether, melts at 60° C.–65° C. Further recrystallization from the same solvents afforded an analytical sample melting at 64° C.–65.5° C.

*Analysis.*—Calc'd for $C_{14}H_{21}NO_4$ (percent): C, 62.90;

H, 7.92; N, 5.24. Found (percent): C, 62.50; H, 7.68; N, 5.21.

EXAMPLE 11

1-(2-hydroxyphenoxy)-3-morpholino-2-propanol

In the same manner as set forth in Example 9, a mixture of 20 g. of 1-(2-methoxyphenoxy)-3-N-morpholino-2-propanol and 200 ml. of 48% hydrobromic acid was stripped to dryness on a rotor under reduced pressure. The resulting solid was recrystallized from ethanol-diethyl ether to give 27.9 g. of 1-(2-hydroxyphenoxy)-3-morpholino-3-propanol hydrobromide melting at 110° C.–115° C. Further recrystallization from the same solvents afforded an analytical sample melting at 114° C. 116° C.

Analysis.—Calc'd for $C_{13}H_{20}BrNO_4$ (percent): C, 46.71; H, 6.03; N, 4.19. Found (percent): C, 46.18; H, 6.03; N, 3.99.

What is claimed is:

1. A compound according to claim 7 wherein $R_1$ is methoxy, $n$ is 2, and Z is ethylene thus forming 1-(2,6-dimethoxyphenoxy)-3-(2 - morpholinoethylamino)-2-propanol.

2. A compound according to claim 7 wherein $R_1$ is hydroxy, $n$ is 1, and Z is ethylene thus forming 1-(2-hydroxyphenoxy)-3-(2 - morpholinoethylamino)-2-propanol.

3. A compound according to claim 7 wherein $R_1$ is methoxy, $n$ is 1 and Z is ethylene thus forming 1-(2-methoxyphenoxy) - 3 - (2-morpholinoethylamino)-2-propanol.

4. A compound according to claim 7 wherein $R_1$ is methoxy, $n$ is 1 and Z is ethylene thus forming 1-(3-methoxyphenoxy) - 3 - (2-morpholinoethylamino)-2-propanol.

5. A compound according to claim 7 wherein $R_1$ is methoxy, $n$ is 1 and Z is ethylene thus forming 1-(4-methoxyphenoxy)-3-(2-morpholinoethylamino-2-propanol.

6. A compound according to claim 7 wherein $R_1$ is methoxy, $n$ is 1 and Z is propylene thus forming 1-(2-methoxyphenoxy) - 3-(3-morpholinopropylamino)-2-propanol.

7. A compound selected from the group consisting of a compound having the structural formula

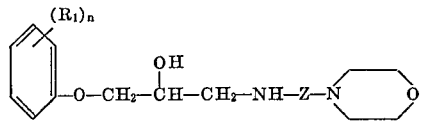

wherein $R_1$ is a member selected from the group consisting of hydroxy and lower alkoxy having from 1 to 3 carbon atoms;

$n$ is a number selected from 1 and 2;

Z is an unsubstituted straight chain saturated hydrocarbon of up to 4 carbon atoms;

and pharmaceutically acceptable acid addition salts thereof.

References Cited

UNITED STATES PATENTS

| | | | |
|---|---|---|---|
| 3,275,654 | 9/1966 | Wilhelm et al. | 260—326.14 |
| 3,328,424 | 6/1967 | Schenker et al. | 260—326.14 |
| 3,332,997 | 7/1967 | Renner et al. | 260—570.7 |
| 3,432,545 | 3/1969 | Howe | 260—570.7 |

ALEX MAZEL, Primary Examiner

J. TOVAR, Assistant Examiner

U.S. Cl. X.R.

424—248

UNITED STATES PATENT OFFICE
CERTIFICATE OF CORRECTION

Patent No. 3,524,851  Dated August 18, 1970

Inventor(s) Burton Kendall Wasson and Nathan Norman Share

It is certified that error appears in the above-identified patent and that said Letters Patent are hereby corrected as shown below:

In column 1, line 46, change "$NR_3R_4$" to read -- $-NR_3R_4$ --.
In column 2, line 40, correct the structure to read as follows:

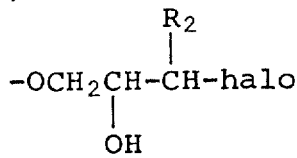

In column 3, line 45, change "ot" to read --to--. In column 4, line 25, change "amine)" to read --amino)--. In column 5, line 54, in the empirical formula, change "H, 7.22" to read --H, 7.32--. In column 6, line 42, immediately preceding "50 ml." insert --in--.

SIGNED AND
SEALED
NOV 24 1970

(SEAL)
Attest:

Edward M. Fletcher, Jr.
Attesting Officer

WILLIAM E. SCHUYLER, JR.
Commissioner of Patents

R-675.42-H